(12) United States Patent
Limell et al.

(10) Patent No.: US 7,677,845 B2
(45) Date of Patent: Mar. 16, 2010

(54) DRILL AND A DRILL CUTTING INSERT

(75) Inventors: Michael Limell, Sandviken (SE); Torbjörn Wikblom, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 682 days.

(21) Appl. No.: 11/657,114

(22) Filed: Jan. 24, 2007

(65) Prior Publication Data

US 2007/0201962 A1 Aug. 30, 2007

(30) Foreign Application Priority Data

Jan. 30, 2006 (SE) .................................... 0600217

(51) Int. Cl.
*B23B 51/02* (2006.01)

(52) U.S. Cl. .................. 408/223; 407/48; 408/227; 408/233; 408/713

(58) Field of Classification Search .................. 407/48, 407/103, 113; 408/223–225, 227, 229–233, 408/713; *B23B 51/00, 51/02*
See application file for complete search history.

(56) References Cited

U.S. PATENT DOCUMENTS 5,954,459 A * 9/1999 Noguchi et al. ............... 408/59
6,039,515 A * 3/2000 Lamberg ...................... 408/188
6,527,486 B2 * 3/2003 Wiman et al. ................. 408/188
7,021,871 B2 * 4/2006 Arvidsson et al. ............ 407/113
7,241,083 B2 * 7/2007 Nada et al. .................... 407/114
7,281,884 B2 * 10/2007 Maeda ......................... 407/113

FOREIGN PATENT DOCUMENTS

| JP | 2005205527 A | * | 8/2005 |
| WO | 03/099494 | | 12/2003 |
| WO | 03/099495 | | 12/2003 |

* cited by examiner

*Primary Examiner*—Daniel W Howell
(74) *Attorney, Agent, or Firm*—Drinker Biddle & Reath LLP (57) ABSTRACT

A drill for chip removing machining, including a drill body, and a replaceable cutting insert mounted in a pocket formed in a front tip of the drill body. A chip flute extends backwardly from the pocket along the drill body, and the cutting insert is fixed in the pocket by a screw including a head and a shank having a male thread. The cutting insert includes a through hole extending between a topside and an underside. The hole has a basic shape that is rotationally symmetrical in relation to a center axis, and is delimited by a series of surfaces including a mouth surface, converging downward from the topside, and a shoulder surface. The head of the screw is kept pressed against the shoulder surface when the male thread of the screw is tightened in a female thread included in a hole that mouths in a bottom of the pocket. The mouth surface in the hole of the cutting insert has a trumpet-like, cross sectionwise convex shape adjacent to the topside of the cutting insert.

17 Claims, 8 Drawing Sheets

DRILL AND A DRILL CUTTING INSERT

This application claims priority under 35 U.S.C. §119 to Sweden Patent Application No. 0600217-4, filed on Jan. 30, 2006, the disclosure of which is incorporated by reference herein in its entirety.

FIELD OF THE INVENTION

The present invention relates generally to a drill for chip removing machining of the type that includes a drill body, and a replaceable cutting insert which is mounted in a pocket formed in a front tip of the drill body. A chip flute extends rearwardly along the drill body from the pocket. The cutting insert is fixed in the pocket by means of a screw which includes a head and a shank having a male thread. The cutting insert includes a through hole extending between a topside and an underside. The hole has a basic shape that is rotationally symmetrical in relation to a center axis, and is delimited by a series of surfaces including a mouth surface, converging downward from the topside, and a shoulder surface. The head of the screw is kept pressed against the shoulder surface when the male thread of the screw is tightened in a female thread included in a hole that mouths in a bottom of the pocket. The present invention also relates to a drill cutting insert as such.

BACKGROUND OF THE INVENTION

Problems associated with drills for the machining of, above all, workpieces of metal form the basis of this invention. Specifically, problems have arisen in the type of drill which is disclosed in International Patent Publication Nos. WO 03/099494 and WO 03/099495, and commercially available under the trademark CoroDrill 880®. In order to provide a thorough understanding of the background of the invention, reference is made to the aforementioned patent documents, as well as to the following description in combination with FIGS. 1-5.

Figure 1:
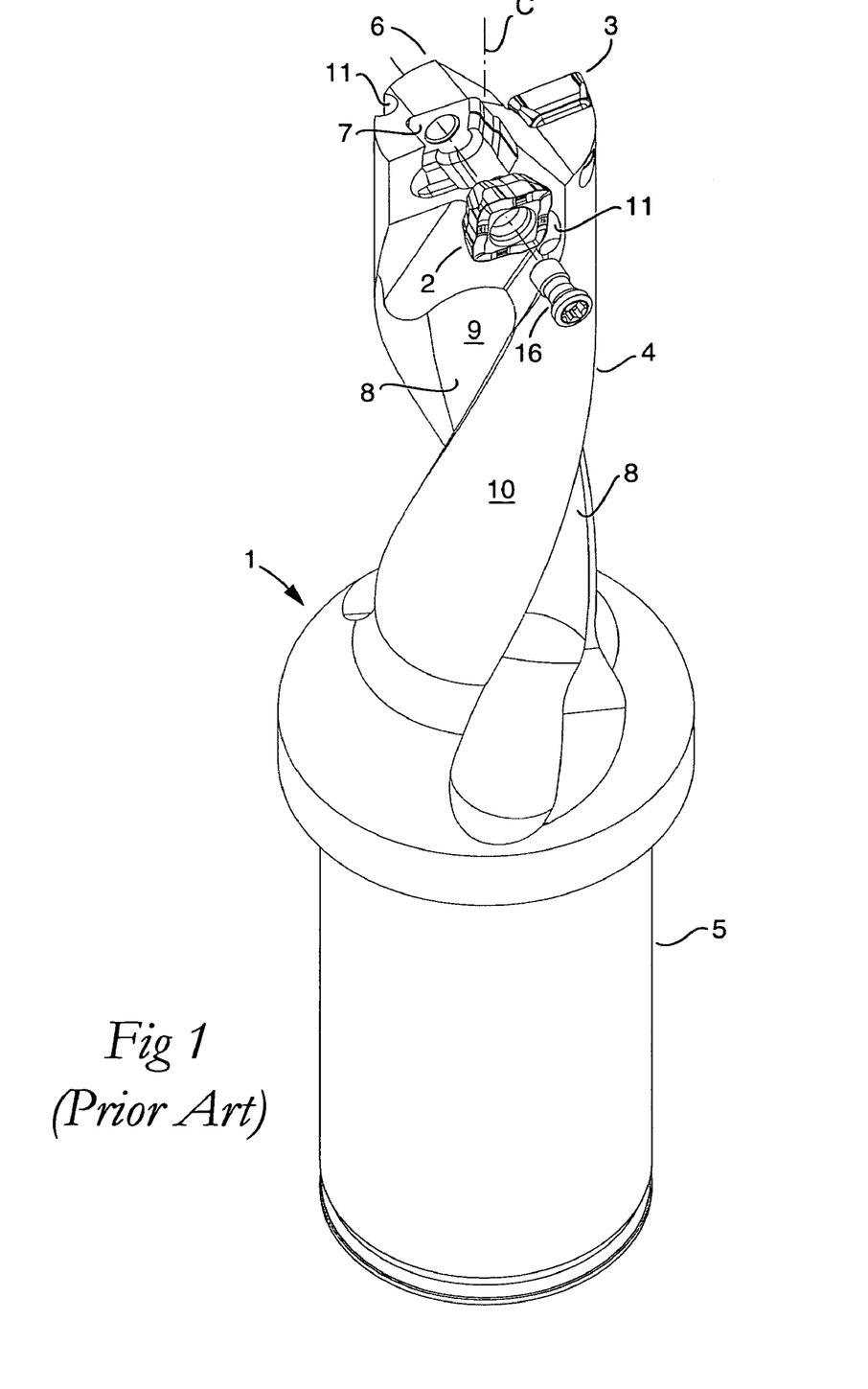
FIG. 1 is a perspective exploded view showing the general nature of a prior art drill.

The drill shown in FIG. 1 includes a basic body or drill body 1 as well as two cutting inserts 2, 3, insert 2 being a center insert and insert 3 being a peripheral insert. The drill body 1 includes a front part 4 in the form of a shank, as well as a rear part 5 intended to be mounted in a machine that can set the drill in rotation. The cutting inserts 2, 3 are arranged at the front end or tip 6 of the drill body. The proper drill body 1 may—but need not—be solid and manufactured from, for instance, steel, while the cutting inserts 2, 3 are made from a harder and more wear-resistant material, such as cemented carbide, ceramics or the like.

Each individual cutting insert is mounted in a pocket 7 of which only the pocket intended for the center insert 2 is visible in FIG. 1. Rearward from each pocket 7, a chip flute 8 extends, which in this case is helicoidal and delimited by a concavely arched limiting surface 9. The two chip flutes 8 are situated between two bars, the envelope surfaces 10 of which are cylindrical. The chip flutes may also have another shape, e.g., straight. Internally in the drill body, channels 11 run, which mouth near the cutting inserts and have the purpose of conveying liquid to the tip of the drill with the aim of cooling the cutting inserts and the chips as well as supporting the chip evacuation from the cutting inserts.

Figure 2:
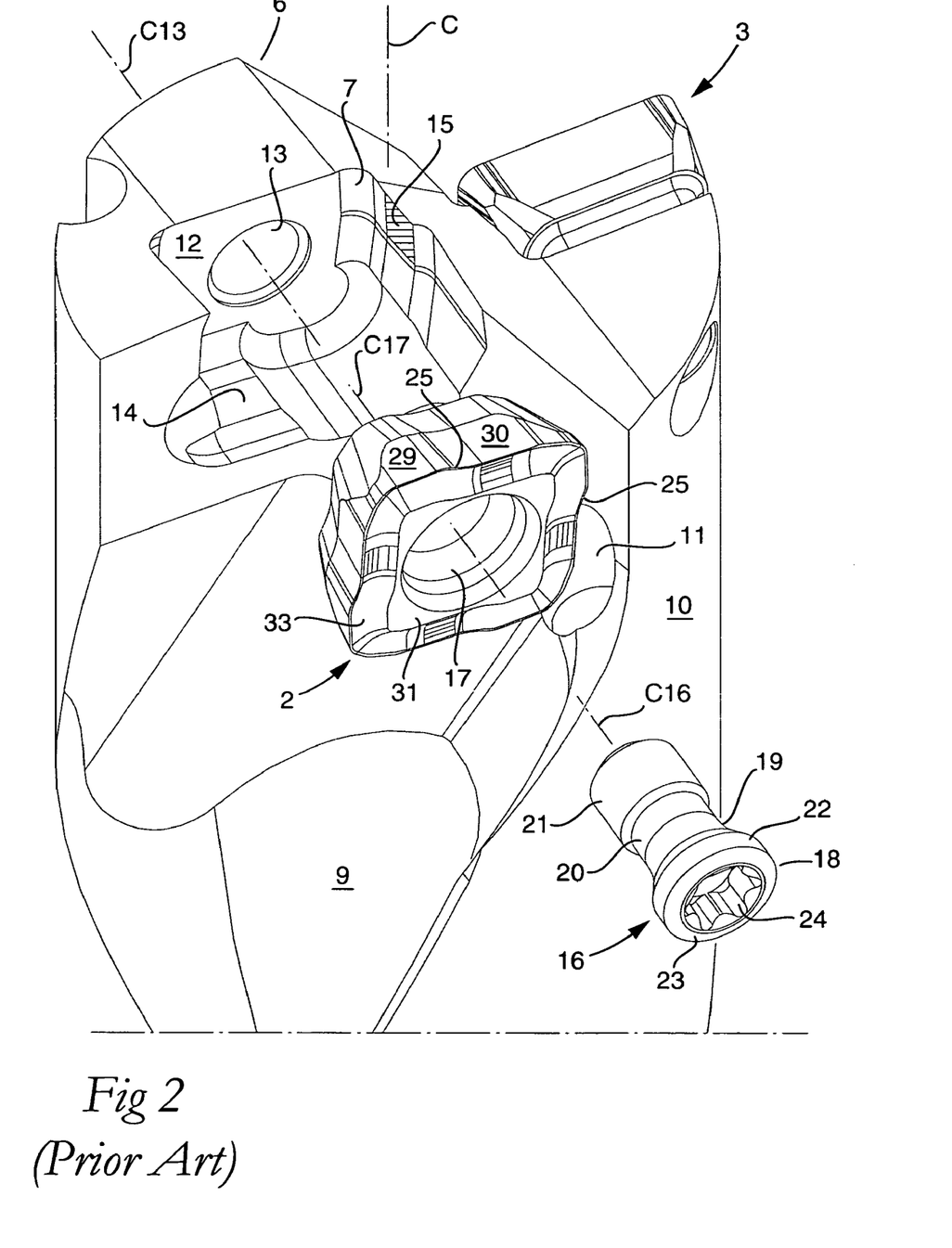
FIG. 2 is an enlarged exploded view of the front tip of the prior art drill, in which a pocket is included in which a replaceable cutting insert, more precisely a center insert, is fixable by means of a tightening screw.

Reference is now made to FIG. 2, which on an enlarged scale shows the nature of the center pocket 7. The pocket includes a bottom 12, which in this case is a planar surface in which a hole 13 mouths, in which a female thread (not visible) is formed. At a distance from the bottom surface 12, two side support surfaces 14, 15 are formed, surface 14 having the purpose of carrying such substantially axially directed forces that act against the cutting insert, while side support surface 15 has the purpose of carrying substantially radially directed forces. In practice, these forces are a combination of cutting forces and a bias force, which is applied to the cutting insert upon mounting.

Fixation of the cutting insert 2 in the pocket 7 is effected by means of a tightening screw 16, which may be inserted through a through, central hole 17 in the cutting insert. The screw 16 includes a head 18, which in this case has a tapered neck 19, which transforms into a cylindrical shank 20 having a male thread 21 (which for the sake of simplicity only has been shown as a neutral surface). In this case, the envelope surface 22 of the head is cylindrical and transforms into an annular surface 23, which is chamfered and surrounds an internal key grip 24. All external part surfaces of the screw are rotationally symmetrical and concentric with the center axis C16 of the screw.

In this connection, it should be pointed out that the center axis of the hole 17 is designated C17, while the center axis of the hole 13 is designated C13.

The cutting insert in question includes four identical cutting edges 25 (see also FIG. 3), which allows indexing of the cutting insert into four positions. Each individual cutting edge 25 is formed with two part edges 26, 27, which transform into each other via an inclined intermediate edge 28. Generally, the part edge 26 is situated farther out from the center C17 of the cutting insert than the part edge 27. As is seen in FIG. 2, two separated, suitably planar clearance surfaces 29, 30 connect to the two part edges 26, 27. When the cutting insert shown in FIG. 2 is fixed in the pocket 7, a clearance surface 30 is pressed against the axial support surface 14, at the same time as a clearance surface 29 is pressed against the radial support surface 15.

Figure 3:
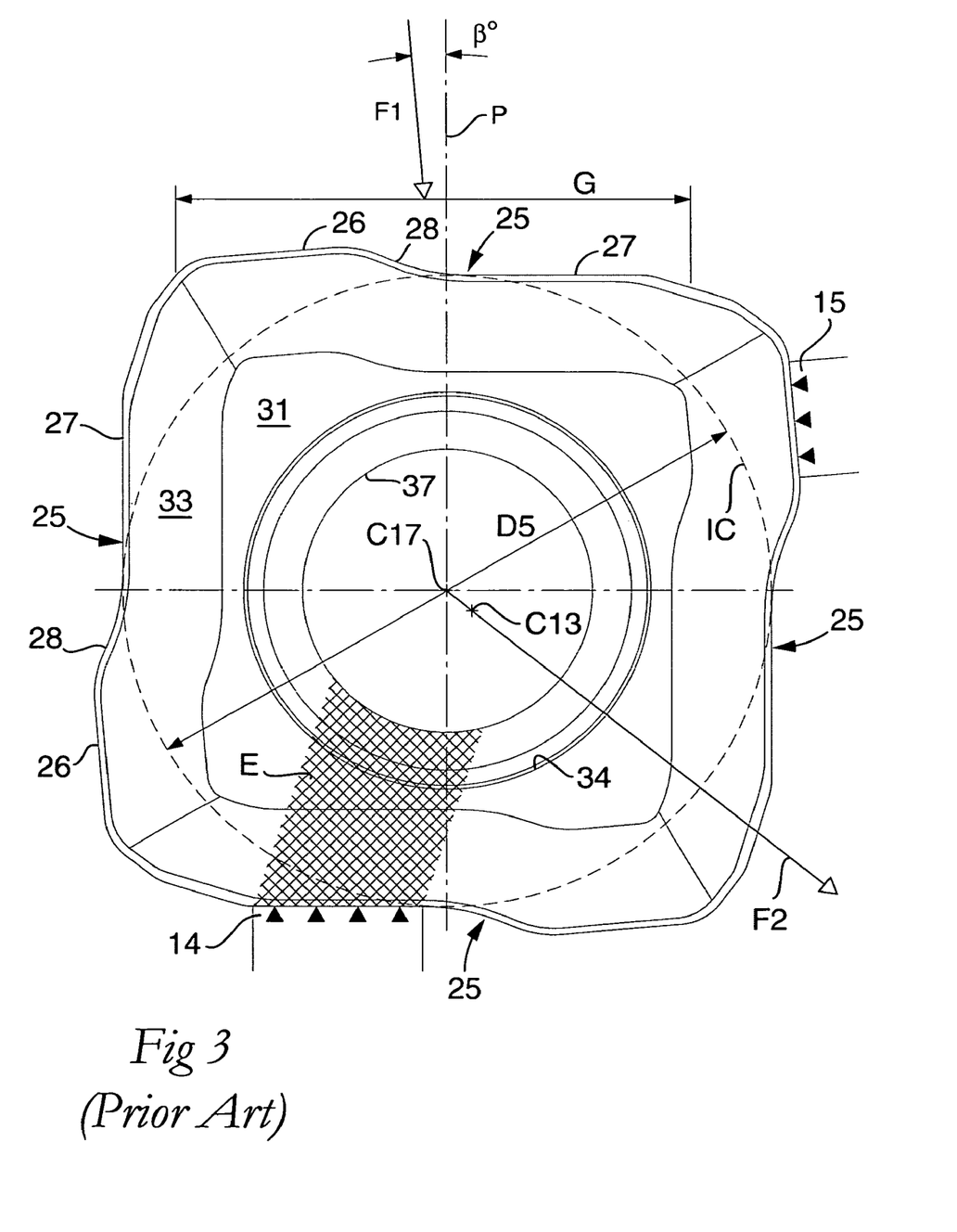
FIG. 3 is a further enlarged plan view from above of the prior art cutting insert for the drill of FIGS. 1 and 2.
Figure 4:
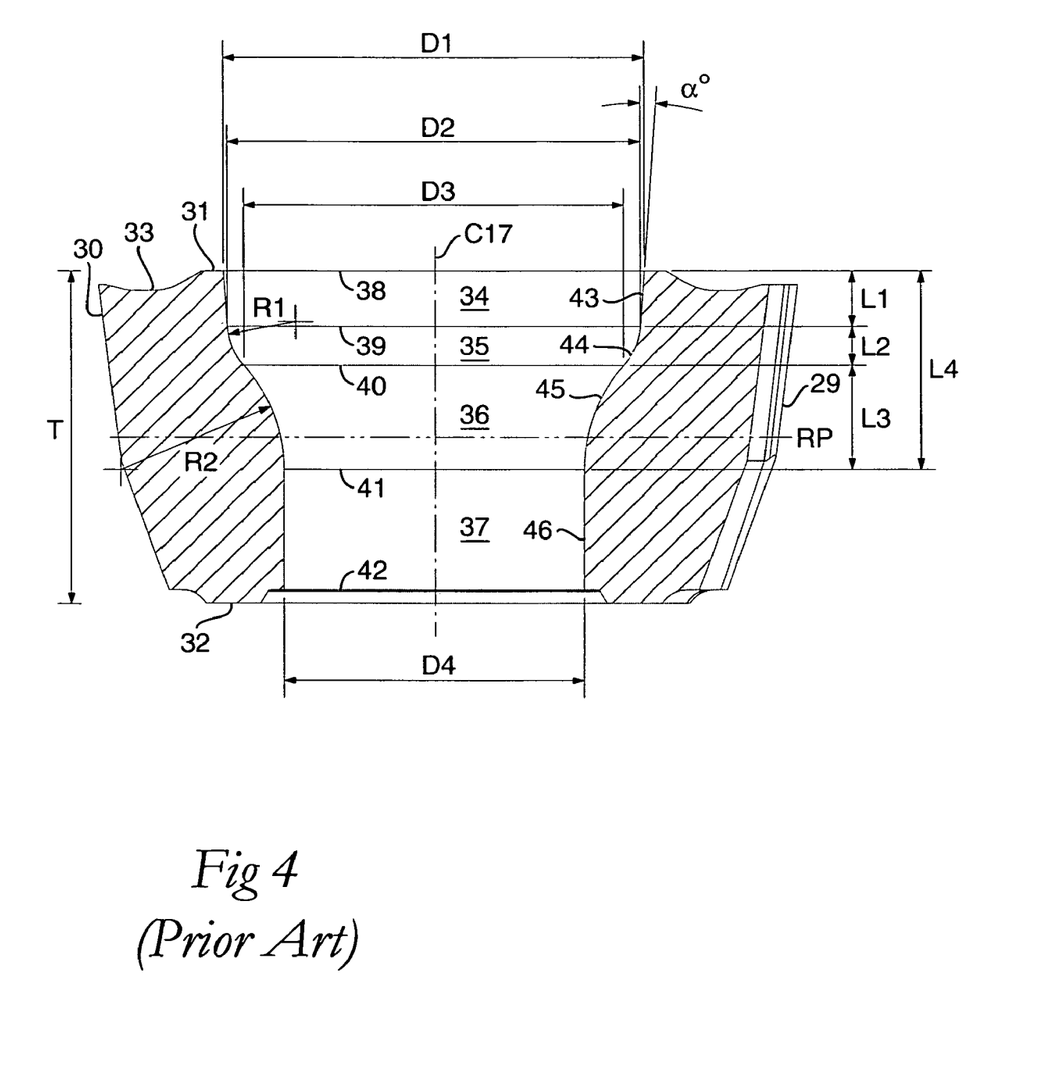
FIG. 4 is a cross-section through the prior art cutting insert of FIG. 3.

Reference is now made to FIGS. 3 and 4. The through hole 17 extends between a topside, such as the same is represented by a surface 31, which in this case is planar, and an underside 32, which likewise is a planar surface. The lower surface 32 may be ground. Between the surface 31, situated in the immediate vicinity of the hole, and the peripheral cutting edges 25, surfaces 33 extend, which form chip surfaces having the purpose of shaping or breaking and guiding the released chips.

The hole 17 in the cutting insert is delimited by a number of part surfaces 34, 35, 36 and 37, each one of which has a rotationally symmetrical shape and is concentric with the center axis C17. Axially, the various part surfaces are delimited by circular borderlines 38, 39, 40, 41 and 42, which are oriented perpendicularly to the center axis C17. The surface 34, which henceforth is denominated mouth surface, has a conical shape by the fact that the curve or generatrix that defines the rotationally symmetrical shape is a straight line 43, which forms an acute angle $\alpha$ with the center axis C17. In the example, the angle $\alpha$ amounts to 4°. The surface 35, which in this case forms a transition surface to the surface 36 serving as a shoulder surface, has in this case a concave shape by being defined by a concave arc line 44. The shoulder surface 36 is, on the other hand, convexly arched by being defined by a convex arc line 45. In the example, the surface 37 positioned under the shoulder surface 36 is cylindrical by being defined by a straight line 46, which is parallel to the center axis C17. The upper borderline 38 of the mouth surface 34, which also forms an inner borderline of the top surface 31, has a diameter designated D1. The lower borderline 39 has a diameter D2 that is smaller than D1. The diameter D3 of the lower borderline 40 of the transition surface 35 is even smaller, which lower borderline forms the upper borderline of the shoulder surface 36. The diameter D4 of the cylinder surface 37, which mouths in the underside of the cutting insert, is smallest.

The axial extension (i.e. the axial distance between the borderlines 38, 39) of the mouth surface 34 is designated L1. In an analogous way, the axial extensions of the surfaces 35, 36 are designated L2 and L3, respectively. Furthermore, the radius of curvature of the arc line 44, which determines the concave shape of the surface 35 is designated R1, while the radius of curvature of the arc line 45, which defines the convex shape of the shoulder surface 36, is designated R2.

In FIG. 3, the inscribed circle IC of the cutting insert is shown, the diameter of which is designated D5. In practice, this so-called IC-measure is used to individually establish or categorize the dimension of the cutting insert. In the embodiment shown in FIGS. 1-5, the drill 1 is the smallest drill included in a greater set, the drill should be capable of drilling holes having a diameter in the range of 14.0-16.5 mm. In this interval, the center insert 2 has the IC-measure of 4.9 mm. With renewed reference to FIG. 4, it should be noted that the shape of the cutting insert in question is determined by the following absolute measures:

The thickness T (i.e. the distance between the surfaces 31, 32) is 2.50 mm.

The greatest diameter (i.e. the upper borderline 38 of the mouth surface 34) of the hole 17 is 3.08 mm.

The smallest diameter D2 (i.e. the borderline 39) of the mouth surface 34 is 3.03 mm.

The smallest diameter D3 (i.e. the borderline 40) of the transition surface 35 is 2.78 mm.

The diameter D4 (i.e. the borderlines 41, 42) of the cylinder surface 37 is 2.20 mm.

The axial extension L1 of the mouth surface 34 is 0.42 mm.

The extension L2 of the transition surface 35 is 0.29 mm.

The length extension L3 of the convex shoulder surface 36 is 0.78 mm. Hence, it follows that the axial distance L4 between the borderlines 38 and 41 is 1.49 mm.

The radius of curvature R1 of the transition surface 35 is 0.5 mm.

The radius of curvature R2 of the shoulder surface 36 is 1.2 mm.

In FIG. 4, RP designates a reference plane parallel to the surfaces 31, 32 and situated halfway between the same. As is seen in the figure, the lower borderline 41 of the shoulder surface 36 is (in this connection) situated a considerable distance below the reference plane RP, more precisely 0.24 mm under the same.

In practice, the construction of tools for chip removing or cutting machining involves a delicate compromising between conflicting desires. This applies also to the drill and the cutting insert of present interest. Thus, on one hand it is desirable to use a heavy duty screw to anchor the cutting insert, but on the other hand a big screw would require a hole that reduces the material thickness of the cutting insert to such a great extent that the cutting insert becomes too weak to withstand the stresses acting on the same during mounting and drilling. Furthermore, in opposition to the desire to retain as much material as possible in the cutting insert, is the need for a certain width of the chip surfaces 33 countersunk in relation to the topside 31 of the cutting insert. Even if it is desirable to let the top surface extend all the way out to the cutting edges for reasons of material strength, the chip surfaces 33 must have a smallest width of the type that is shown in the drawings to be able to fulfil the purpose of shaping and guiding the chips.

Figure 5:
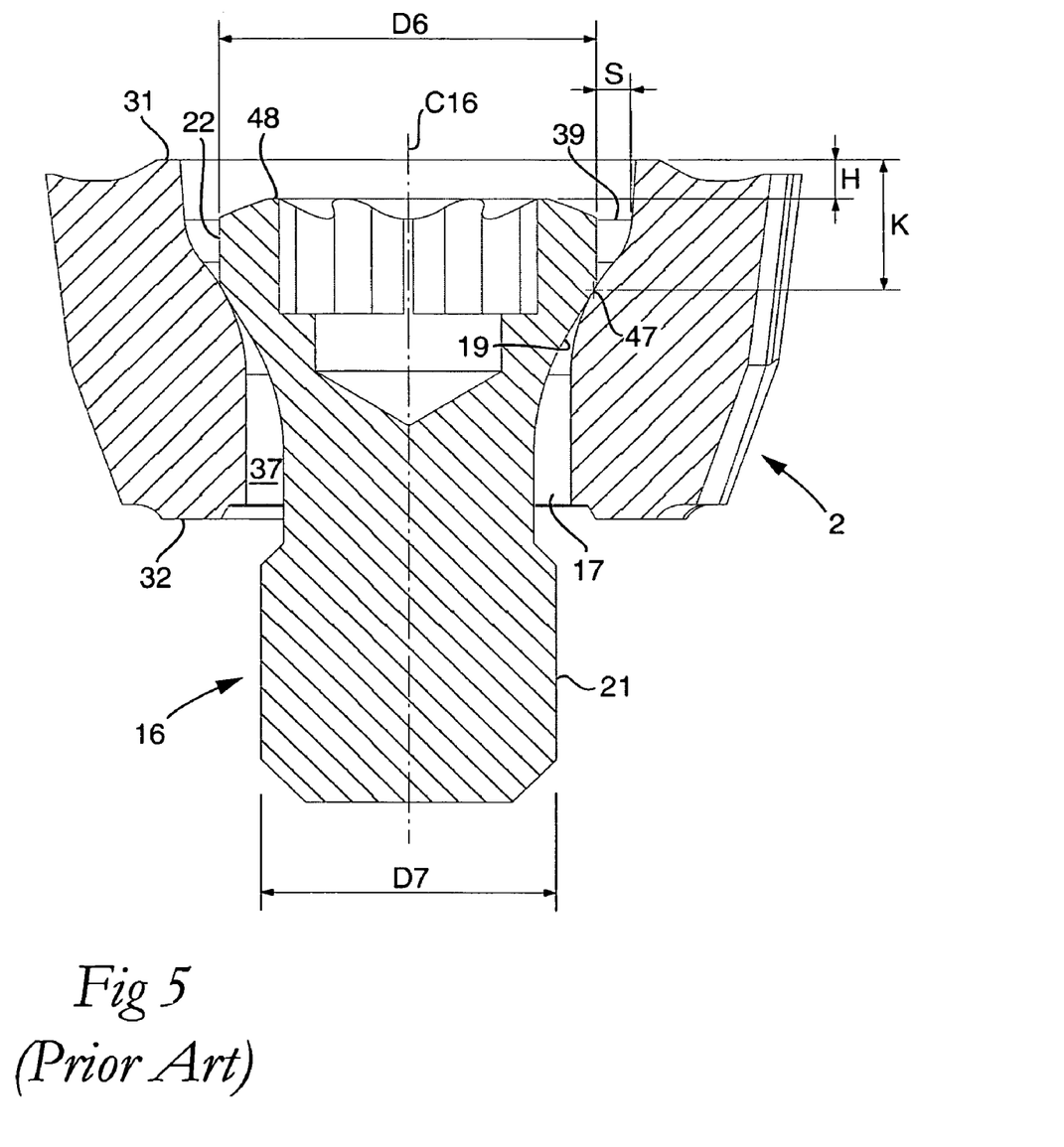
FIG. 5 is a section corresponding to FIG. 4 showing the tightening screw placed in a through hole in the prior art cutting insert.

In FIG. 5, the screw 16 is shown applied in the center hole 17 of the cutting insert 2, however without being tightened in the hole 13. The head of the screw has an outer diameter D6 (along the envelope surface 22) of 2.55 mm. Hence, it follows that the annular gap S, which is formed between the envelope surface 22 of the head and the lower borderline 39 of the mouth surface 34, has a width of 0.24 mm. The measure K designates the level below the top surface 31 on which the tapering neck 19 of the screw contacts the shoulder surface 36. At least as long as the screw has not been coined, this contact has the form of a circumferential line contact. In the present case, K is 0.91 mm. Furthermore, it should be noted that the contact line is situated very near under the comparatively sharp edge 47 where the envelope surface 22 transforms into the neck 19. FIG. 5 shows how the diameter D7 of the male thread 21 is somewhat smaller than the diameter D4 of the cylinder surface 37. Thus, in the embodiment, D7 is 2.0 mm, which means that the thread of the screw can pass through the smallest section of the hole having a total a play of 0.2 mm (0.1 mm on each side).

On the above-mentioned presumptions, the topside of the screw, such as the same is represented by a slender, annular planar surface 48, is situated 0.27 mm (the measure N) below the surface 31. In other words, the level difference N is, in this case, more than 10% of the thickness T (2.50 mm) of the cutting insert.

One and the same type of screw is used to fix the center insert 2 as well as the peripheral insert 3. The fact is that, in practice, it would be very hard to keep a check on two different types of screws, even if the cutting inserts 2, 3 are different in respect of cutting edges and clearance surfaces.

Furthermore, tools for drilling in one respect differ considerably from other cutting tools, such as tools for turning or milling, viz. what relates to the chip breaking and the evacuation of the released chips. In, for instance, external turning and milling, respectively, the released chip can fairly freely leave the cutting insert, but in drilling, the chip has compulsorily to be broken and evacuated within the chip flutes that extend rearward from the cutting inserts. This imposes particularly stiff requirements on the capability of the cutting inserts to form or break and guide the chips in an optimal way. The chip evacuation from the center insert is particularly delicate as a consequence of the fact that infinitesimal points along the active cutting edge move at different periphery speeds in relation to the center axis of the drill. Thus, near the center of the drill, the speed of the cutting edge is approximately zero, and then the same increases successively toward the end of the cutting edge situated outermost from the center. The chips may be small and have a substantially triangular comma-like shape, and may be generated in large quantities. The chips may also be long and helicoidal. However, because the chip flute in the drill body is comparatively narrow, chips will constantly pass along the topside of the cutting insert in the backward direction from the frontal, active cutting edge. This is one of the reasons for the head of the screw being countersunk under the topside of the cutting insert, because if the head should stick up, the same would be worn out quickly.

Generally, the drill known by International Patent Publication Nos. WO 03/099494 and WO 03/099495 has involved major technical and economical achievements within the field of drilling in metallic workpieces. Thus, it has turned out that it has been possible to increase the feed speed of the drill by 50 to 100% in relation to other, comparable drills. Furthermore, the drill has excellent entering properties, above all as a consequence of the unique design of the center insert, which is characterized by the fact that the active cutting edge includes two part edges, one of which is situated axially in front of the other.

The market introduction of the drill in question was preceded by extensive strength calculations, which unambiguously indicated that all cutting inserts in the entire set of drills would by margin resist the stresses induced by practical drilling. Therefore, the surprise was great when crack formation occurred in the center inserts of the smallest drills in the set. Specifically, cracks appeared in the screened field E shown in FIG. 3. As is seen in the figure, this field extends from the axial support surface 14 in the direction inwards toward the center of the cutting insert. The appearance of the cracks in this area was initially difficult to explain considering that this part of the cutting insert has a good support against the axial support surface 14.

In order to explain the interaction of forces that act on the cutting insert, the distance along the active, front cutting edge 25, where the chip is separated, is illustrated by G. Axial as well as radial cutting forces act on the cutting insert, the resultant of which attacks the cutting insert in the direction of the arrow F1. This force resultant forms an angle β with the plane P. In practice, the angle β is about 5°. This means that the force resultant is directed toward the rear part of the cutting insert situated beside the axial support surface 14 (note that the entire part of the cutting insert that extends from the axial support surface 14 to the radial support surface 15 lacks support against the clearance surfaces thereof). Therefore, a plausible theory was that the cutting insert, in spite of all, had been under-sized for the actual cutting forces. However, this proved not to be the case.

Another explanation to the emergence of the cracks was looked for in the fact that the tightening screw 16 in question is spring biased. Such spring bias is traditionally provided by the center C13 of the hole 13 being placed in such a way in relation to the support surfaces 14, that the center C17 of the cutting insert hole 17 is eccentrically located in relation to the same. Therefore, when the screw is tightened in the screw hole 13, a tightening force is applied to the cutting insert in the direction of the arrow F2, which presses the cutting insert against the two support surfaces 14, 15. However, careful examination showed that neither the spring bias force F2 (which may be approximately equally large as the cutting-force resultant)—neither as viewed separately nor in combination with the cutting-force resultant F1—could give rise to the cracks. Therefore, the crack formation was initially inexplicable prior to Applicants' invention.

SUMMARY OF THE INVENTION

In an embodiment, the invention provides a drill for chip removing machining, including a drill body, and a replaceable cutting insert mounted in a pocket formed in a front tip of the drill body. A chip flute extends backwardly from the pocket along the drill body, and the cutting insert is fixed in the pocket by a screw including a head and a shank having a male thread. The cutting insert includes a through hole extending between a topside and an underside. The hole has a basic shape that is rotationally symmetrical in relation to a center axis, and is delimited by a series of surfaces including a mouth surface, converging downward from the topside, and a shoulder surface. The head of the screw is kept pressed against the shoulder surface when the male thread of the screw is tightened in a female thread included in a hole that mouths in a bottom of the pocket. The mouth surface in the hole of the cutting insert has a trumpet-like, cross section-wise convex shape adjacent to the topside of the cutting insert.

In another embodiment, the invention provides a drill cutting insert, including a topside and an underside between which a through hole extends. The through hole includes a basic shape that is rotationally symmetrical in relation to a center axis, and is delimited by a series of surfaces including a mouth surface, converging downward from the topside, and a shoulder surface. The mouth surface has a trumpet-like, cross section-wise convex shape adjacent to the topside.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

A hint to overcoming the deficiencies of the prior art drills was obtained when tracks or marks from the chips were discovered on the mouth surface 34. From this discovery, the conclusion was drawn that the numerous chips during the passage thereof above the screw head beat against the mouth surface. The beating of the extremely hot chips against the mouth surface by itself applies extraordinary mechanical forces to the rear part of the cutting insert. Furthermore, fragments of the chips are likely to be separated and forced into the wedge-shaped tapering gap S between the envelope surface 22 of the screw head and the upper part of the hole 17 (see FIGS. 4 and 5). If the chip fragments are pressed down by a great force into the gap, a wedge action arises that leads to the cracking of the cutting insert.

Figure 6:
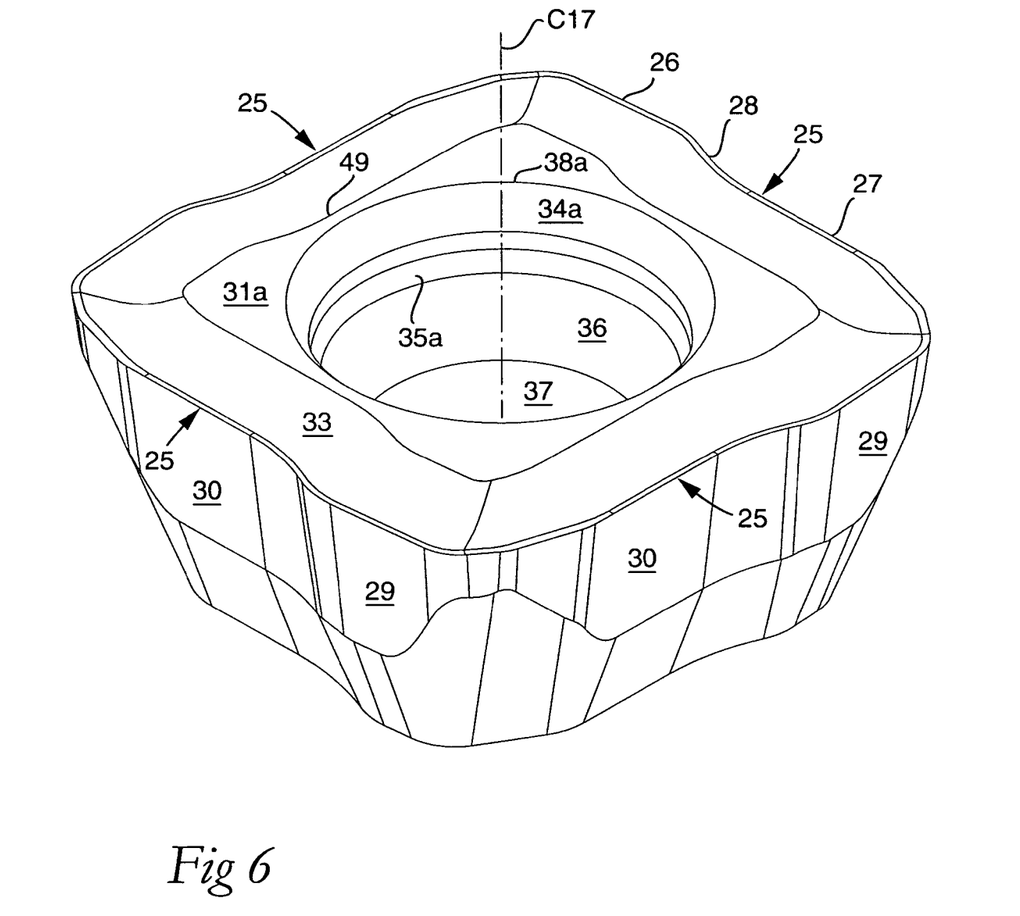
FIG. 6 is a perspective view showing a cutting insert according to an embodiment of the present invention.
Figure 7:
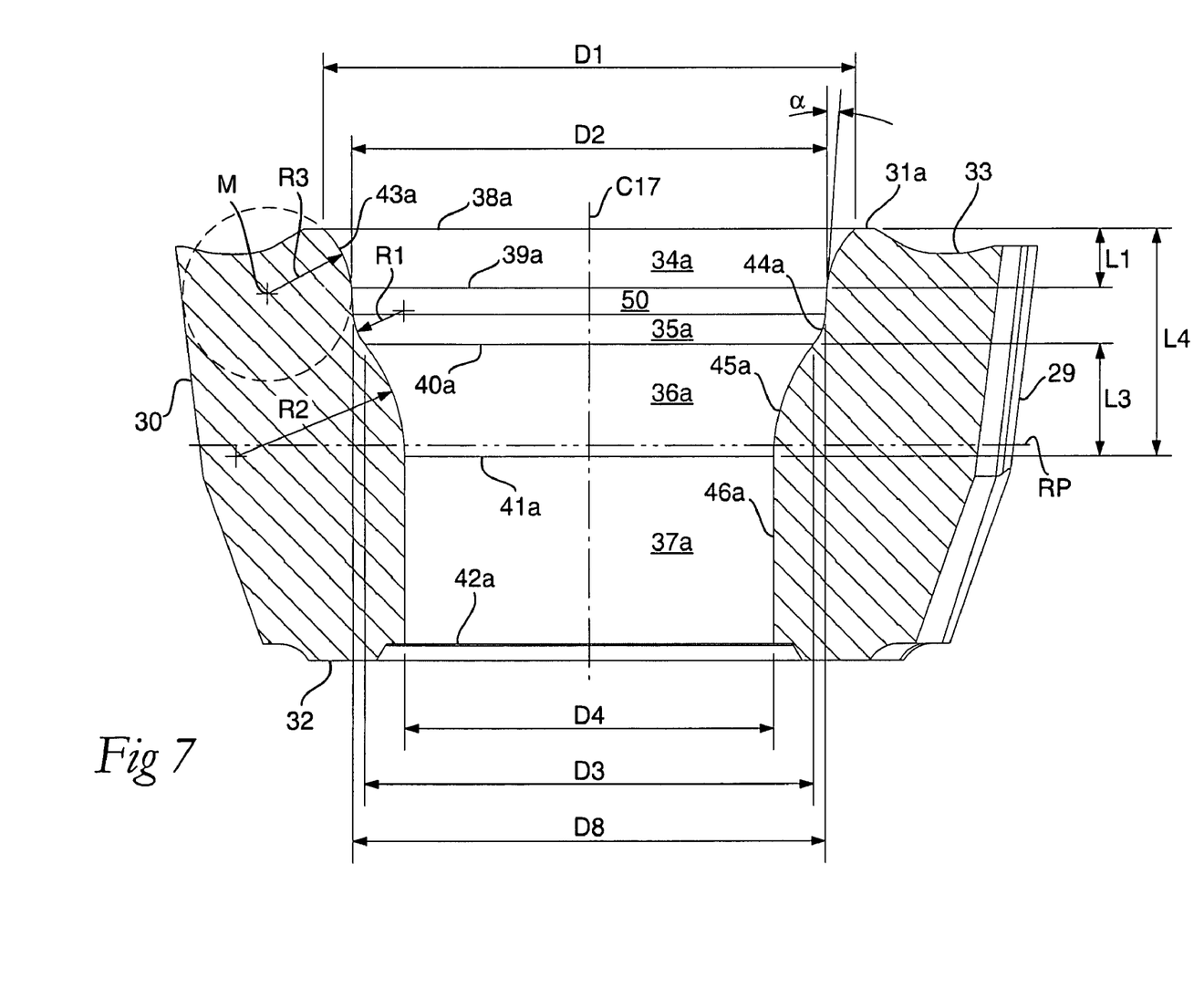
FIG. 7 is a cross-section through the cutting insert of FIG. 6, a number of geometrical data being illustrated that characterize the cutting insert.
Figure 8:
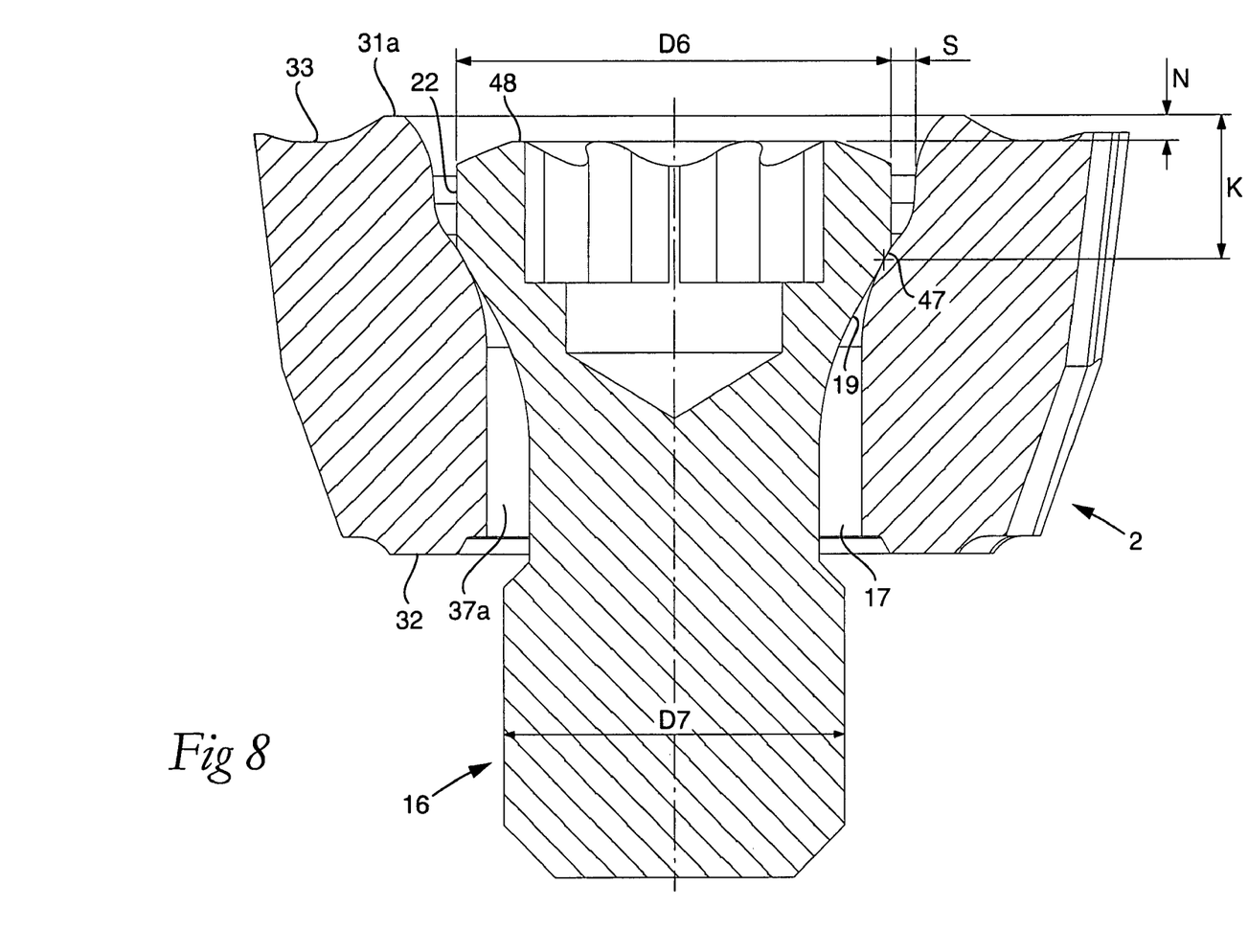
FIG. 8 is a cross-section in which a tightening screw is shown mounted in a through hole of the cutting insert.

Based on the above-mentioned insight, the problem has been solved in the way that is seen in FIGS. 6-8, viz. by making the mouth surface 34 in the hole 17 of the cutting insert with a trumpet-like, cross section-wise convex shape adjacent to the topside 31 of the cutting insert. Exteriorly, the cutting insert according to the embodiment of the invention shown in FIG. 6 has the same design as the known cutting insert, so far that external surfaces, viz. the clearance surfaces 29, 30, and the chip surface 33 (and also the underside 32) have identical shape. The upper, planar surface 31 also has the same general shape as the corresponding surface of the known cutting insert, in so far that the outer borderline 49 is identical to the corresponding borderline of the known cutting insert. However, the area of the surface 31 shown in FIG. 6 is somewhat smaller than in the previous case, so far that the inner circular borderline 38 is somewhat greater than in the known cutting insert. Because of this exterior resemblance, the new cutting insert according to the invention can be applied to existing drills without modification of the same.

In order to distinguish the different features of the cutting insert of the present invention that deviate from the corresponding features in the known cutting insert, analogous reference designations in FIGS. 6-8 have been supplemented with the suffix "a."

Reference is now made to FIGS. 7 and 8, in which the new design of the hole 17 is illustrated in detail.

The trumpet-like convex and rotationally symmetrical shape of the mouth surface 34a is defined, in this case, by an arc line 43a, which extends between the upper and lower circular borderlines 38a, 39a of the surface. According to the instant embodiment, the upper borderline 38a should have a diameter at least 5% greater than the diameter of the lower borderline 39a. In the embodiment shown, the diameter D1 is 3.17 mm and the diameter D2 is 2.84 mm, which means that D1 is about 11.6% greater than D2. In this preferred embodiment, the arc line 43a is circular and has a radius R3 is 0.5 mm. Simultaneously, the lower borderline 39a is situated at a distance L1 of 0.34 mm below the topside 31a. In other words, the radius R3 is somewhat greater than the distance L1, but above all considerably smaller than the smallest diameter D4 of the hole. In the example, R3 is about 23% (0.5/2.2) of D4 and should not exceed 50% of D4. It should also be noted that the center M of the circular arc line 43a is situated near the level of the lower borderline 39a. The radial distance of the center M from the center line C17 is 1.92 mm.

Furthermore, the diameter D2 of the lower borderline 39a should is at most 60% of the diameter D5 of the inscribed circle IC. In the example, the diameter D2 is 2.84 mm, which is about 58% of D5.

Also the convex and rotationally symmetrical shape of the shoulder surface 36a is defined by a circular arc line 45a, which extends between the upper and lower circular borderlines 40a, 41a of the shoulder surface, the upper one 40a of which has a diameter D3 that is greater than the diameter D4 of the lower borderline, as well as at most 5% greater than the diameter of the screw head, such as the same is determined by the borderline 47 between the neck 19 and the rotationally symmetrical envelope surface 22 thereof (see FIG. 8). In this case, the radius R2 of the circular arc line 45a is 1.0 mm, at the same time as the axial distance L3 between the borderlines 40a and 41a is 0.65 mm. This means that the axial length L3 of the shoulder surface 36a is smaller than the corresponding length of the shoulder surface 36 of the known cutting insert, something that has contributed to allow a reduction of the total distance L4 between the top surface 31a and the lower borderline 41a of the shoulder surface, more precisely to 1.31 mm. The result of this is that the head of the screw is located higher up in the cutting insert, so far that the distance K between the top surface 31a and the line contact between the neck and shoulder surface of the screw is reduced from 0.91 mm to 0.82, as well as so far that the distance N between the topside 48 of the screw head and the topside 31 of the cutting insert is reduced from 0.27 mm to 0.14 mm, i.e., is approximately halved. In other words, the distance N between the head of the screw and the topside of the cutting insert is 5.6% of the thickness T of the cutting insert. Although this measure may vary, the same should not exceed 8%. Neither should the distance L4 exceed 55% of the thickness T of the cutting insert.

The cutting insert according to the embodiment also has a transition surface 35a that tapers in the downward direction, and has a concavely arched shape defined by a circular arc line 44a. In this case, the radius R1 of this circular arc line 44a is 0.3 mm.

In order for the greatest diameter of the mouth surface 34a not to become so great that it intrudes on the planar top surface 31a to too great an extent, a slightly conical surface 50 is formed between the mouth surface and the transition surface 35a. The angle α, which determines the conicity of the surface 50, in this case is 4°.

By the fact that the mouth surface of the hole has been given the trumpet-like, cross section-wise convex shape, the chips sliding along the topside of the cutting insert, and partly along the topside of the screw head, can pass fairly unresistingly in the backward direction from the chip-removing edge to the rear end of the cutting insert and further into the chip flute. This should be compared with the steep and sharp-edged mouth surface of the known cutting insert, which has formed an abrupt obstacle against which the chips have beaten and separated off minor component parts, which have been wedged into the space between the inside of the hole and the envelope surface of the screw head. The circumstance that the topside of the screw head is situated fairly near under the topside of the cutting insert (without for that reason sticking up itself from the last-mentioned one) also contributes significantly to the fact that the chips can smoothly pass the mouth surface of the hole in the new cutting insert. As a consequence of the new design of the hole of the cutting insert, also the width of the gap S has been reduced by the order of 30% (from 0.24 mm to 0.18 mm). This fact also contributes to minimizing the risk of bursting effect in the gap. Furthermore, it is emphasized that the problem with crack formation in the cutting insert has been possible to be solved without neither the screw nor the drill body having been needed to be modified.

Although the invention is illustrated in connection with a center insert and including a screw that has a tapering neck (so-called conical screw), the same is also applicable to other types of drill cutting inserts, e.g., peripheral inserts, and to drills having other types of tightening screws, e.g., screws having flat heads. In the last-mentioned case, the shoulder surface in the cutting insert hole is made as a planar, annular surface against which a likewise planar, annular surface of the underside of the screw head is pressed.

The mouth surface of the hole may be given the cross section-wise convex shape thereof in another way than in the form of the shown, softly rounded and smooth surface. Thus, the surface in question may be formed by means of a plurality of facet surfaces that individually are conical, but that together form a convex mouth surface between the described upper and lower borderlines.

Whether the trumpet-shaped mouth surface is in the form of a smooth, arched surface or is composed of a number of broken facet surfaces, it applies that the diameter of arbitrary circular lines along the surface increases in the direction from the lower borderline toward the upper one.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drill for chip removing machining, comprising: a drill body, and a replaceable cutting insert mounted in a pocket formed in a front tip of the drill body, a chip flute extending backwardly from the pocket along the drill body, and the cutting insert being fixed in the pocket by a screw including a head and a shank having a male thread, the cutting insert including a through hole extending between a topside and an underside, the hole having a basic shape that is rotationally symmetrical in relation to a center axis, and is delimited by a series of surfaces including a mouth surface, converging downward from the topside, and a shoulder surface, the head of the screw being kept pressed against the shoulder surface when the male thread of the screw is tightened in a female thread included in a hole that mouths in a bottom of the pocket, wherein the mouth surface in the hole of the cutting insert has a trumpet-like, cross section-wise convex shape adjacent to the topside of the cutting insert.

2. The drill according to claim 1, wherein the mouth surface extends between upper and lower circular borderlines, the upper borderline also forming an inner borderline of the topside, the cross section-wise convex and rotationally symmetrical shape of the mouth surface being defined by a convexly curved line, which extends between the upper and lower borderlines.

3. The drill according to claim 2, wherein the upper borderline has a diameter that is at least 5% greater than the diameter of the lower borderline.

4. The drill according to claim 2, wherein the diameter of the lower borderline is at most 60% of the diameter of an inscribed circle of the cutting insert.

5. The drill according to claim 2, wherein the curved line, which defines the arched shape of the mouth surface, is circular and has a radius of curvature that is at most 50% of the smallest diameter of the hole.

6. The drill according to claim 2, wherein the shoulder surface has a convex and rotationally symmetrical shape defined by an arc line, which extends between upper and lower, circular borderlines, the upper borderline having a diameter that is greater than the diameter of the lower borderline, and at most 5% greater than the diameter of the screw head, as determined by a borderline between a tapering neck and a cylindrical envelope surface of the screw head, the tapering neck being pressed against the shoulder surface of the hole.

7. The drill according to claim 6, wherein the axial distance between the lower borderline of the shoulder surface and the topside of the cutting insert is at most 55% of a thickness of the cutting insert, the topside of the screw head being located at a distance from the topside of the cutting insert, which distance is at most 8% of the thickness of the cutting insert.

8. The drill according to claim 6, wherein a transition surface is formed between the mouth surface and the shoulder surface, the transition surface converging toward the shoulder surface.

9. A drill cutting insert comprising: a topside and an underside between which a through hole extends, which has a basic shape that is rotationally symmetrical in relation to a center axis, and is delimited by a series of surfaces including a mouth surface, converging downward from the topside, and a shoulder surface, wherein the mouth surface has a trumpet-like, cross section-wise convex shape adjacent to the topside.

10. The drill cutting insert according to claim 9, wherein the mouth surface extends between upper and lower, circular borderlines, the upper borderline also forming an inner borderline of the topside, the cross section-wise convex and rotationally symmetrical shape of the mouth surface defining a convexly curved line, which extends between the upper and lower borderlines.

11. The drill cutting insert according to claim 10, wherein the upper borderline has a diameter that is at least 5% greater than the diameter of the lower borderline.

12. The drill cutting insert according to claim 10, wherein the diameter of the lower borderline is at most 60% of the diameter of an inscribed circle of the cutting insert.

13. The drill cutting insert according to claim 10, wherein the curved line, which defines the convex shape of the mouth surface, is circular and has a radius of curvature that is at most 50% of the smallest diameter of the hole.

14. The drill cutting insert according to claim 9, wherein the shoulder surface has a convex and rotationally symmetrical shape defined by an arc line, which extends between upper and lower, circular borderlines, the upper borderline having a diameter that is greater than the diameter of the lower borderline, and at most 5% greater than the diameter of a screw head for fixing the insert to a drill body, as determined by a borderline between a neck and a cylindrical envelope surface of the screw head.

15. The drill cutting insert according to claim 10, wherein a transition surface is formed between the mouth surface and the shoulder surface, the transition surface converging toward the shoulder surface.

16. The drill cutting insert according to claim 15, wherein a conical surface is formed between the mouth surface and the transition surface, the conical surface converges from the mouth surface toward the transition surface.

17. The drill cutting insert according to claim 9, wherein the drill cutting insert is a center insert, that is indexable by including four identical cutting edges, each one of which is formed with two part edges, which are situated at different radial distances from the center axis of the cutting insert.

* * * * *